United States Patent
Huang et al.

(10) Patent No.: US 8,245,986 B2
(45) Date of Patent: Aug. 21, 2012

(54) SUPPORT STAND

(75) Inventors: Lian-Cheng Huang, Shenzhen (CN); Jin-Xin Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 466 days.

(21) Appl. No.: 12/504,771

(22) Filed: Jul. 17, 2009

(65) Prior Publication Data

US 2010/0090070 A1 Apr. 15, 2010

(30) Foreign Application Priority Data

Oct. 10, 2008 (CN) .......................... 2008 1 0304875

(51) Int. Cl.
*A47F 5/00* (2006.01)
*F16M 11/04* (2006.01)
*F16J 1/16* (2006.01)

(52) U.S. Cl. ..................... 248/122.1; 248/127; 403/150; 403/154

(58) Field of Classification Search .................. 248/127, 248/146, 147, 155.4, 122.1; 403/150, 154; 361/681–683
See application file for complete search history.

(56) References Cited

U.S. PATENT DOCUMENTS

| 94,712 | A | * | 9/1869 | Chinnock | .................. 248/122.1 |
| 3,679,317 | A | * | 7/1972 | Larson | .......................... 401/109 |
| 5,356,100 | A | * | 10/1994 | Bookwalter et al. | ........ 248/122.1 |
| 6,039,279 | A | * | 3/2000 | Datcuk et al. | .................. 242/296 |
| 7,764,491 | B2 | * | 7/2010 | Zhao et al. | ............... 361/679.22 |
| 7,974,666 | B2 | * | 7/2011 | Kosugi et al. | .............. 455/575.3 |

FOREIGN PATENT DOCUMENTS

CN 201247355 Y 8/2008

* cited by examiner

*Primary Examiner* — Terrell McKinnon
*Assistant Examiner* — Chiedu Chibogu
(74) *Attorney, Agent, or Firm* — Altis Law Group, Inc.

(57) ABSTRACT

A support stand includes a support body, a connecting member, a fastening assembly. The support body defines an assembling hole. The connecting member is received in the assembling hole of the support body, and defines an engaging hole. The fastening assembly is positioned on the support body. The fastening assembly includes a follower. The follower has a positioning pole. The follower is movably connected to the support body, so that the positioning pole is capable of engaging/disengaging in the engaging hole of the connecting member.

16 Claims, 13 Drawing Sheets

SUPPORT STAND

BACKGROUND

1. Technical Field

The present disclosure relates generally to support stands and, more particularly, to a support stand for a liquid crystal display device.

2. Description of Related Art

Liquid crystal display (LCD) devices are gradually replacing conventional cathode ray tube (CRT) devices because LCD devices have better display qualities and are thinner and lighter than CRT devices. The LCD device generally has a support stand and an LCD panel positioned on the support stand.

Referring to FIG. 13, a typical LCD device 10 includes an LCD panel 11 and a support stand 12. A positioning portion 111 and an engaging portion 115 are formed on the LCD panel 11. The positioning portion 111 defines a sliding groove 112. The engaging portion 115 is elastic and opposite to the sliding groove 112. The support stand 12 includes a base 121 and a support plate 122 extending from a middle portion of the base 121. A sliding plate 123 is formed on a top end of the support plate 122. The sliding plate 123 defines a positioning hole 124. In assembling the LCD device, the sliding plate 123 is pushed into the sliding groove 112 of the positioning portion 111 until the engaging portion 115 is engaged in the positioning hole 124.

However, when disassembling the LCD device 10, a user may need to apply a large force on the positioning portion 111 to deform the positioning portion, so that the positioning portion 111 can disengage from the positioning hole 124. In addition, the positioning portion 111 can easily become abraded during an assembling/disassembling process.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
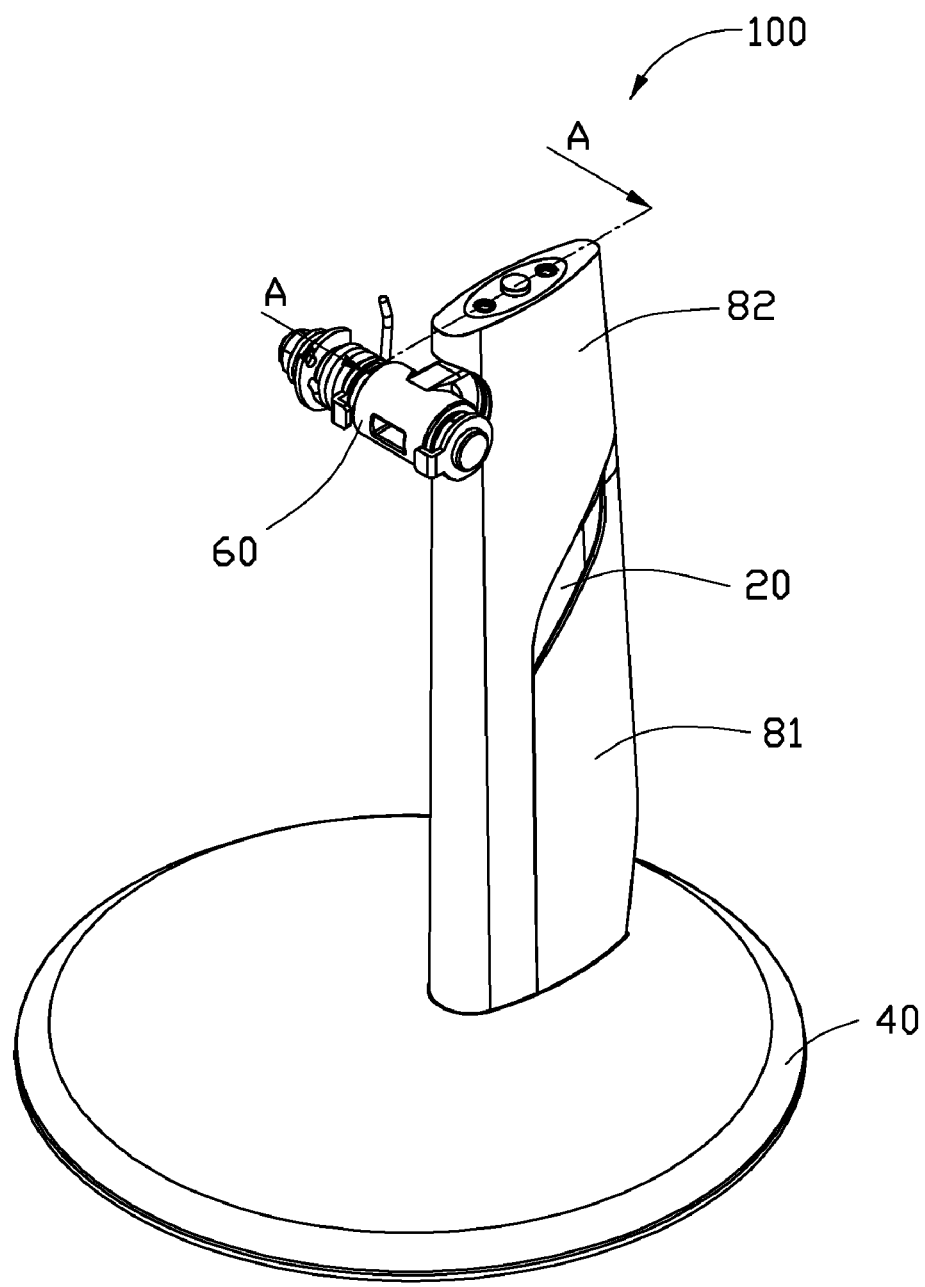
FIG. 1 is an assembled, isometric view of an exemplary embodiment of a support stand, the stand including support stand including a support body, a connecting member, and a fastening assembly.
Figure 2:
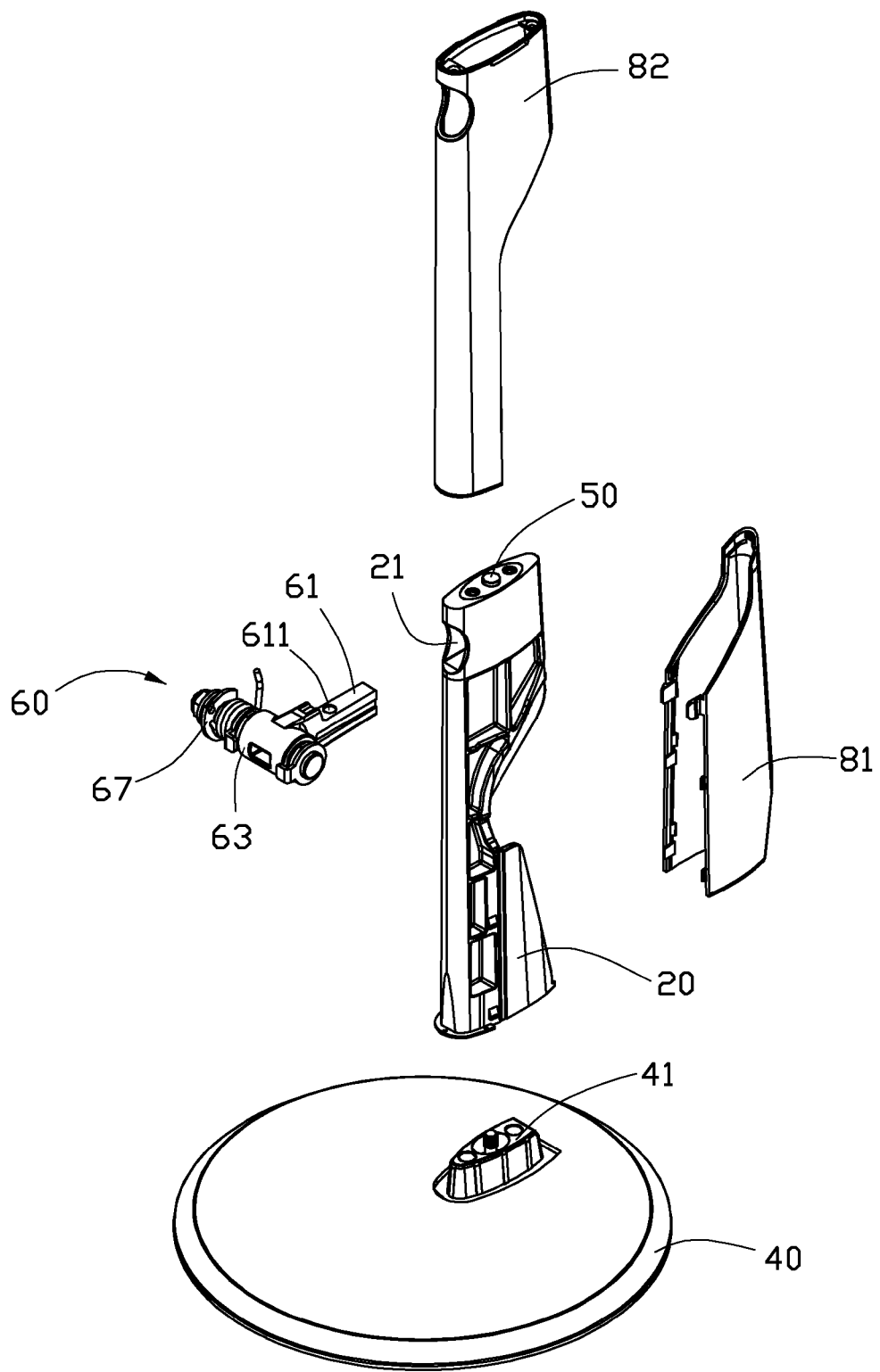
FIG. 2 is an exploded, isometric view of the support stand of FIG. 1.

FIGS. 1 and 2 show an exemplary embodiment of a support stand 100 for use with an LCD device (not shown). The support stand 100 includes a support body 20, a base 40, a fastening assembly 50, a connecting member 60, a first housing 81, and a second housing 82.

Figure 3:
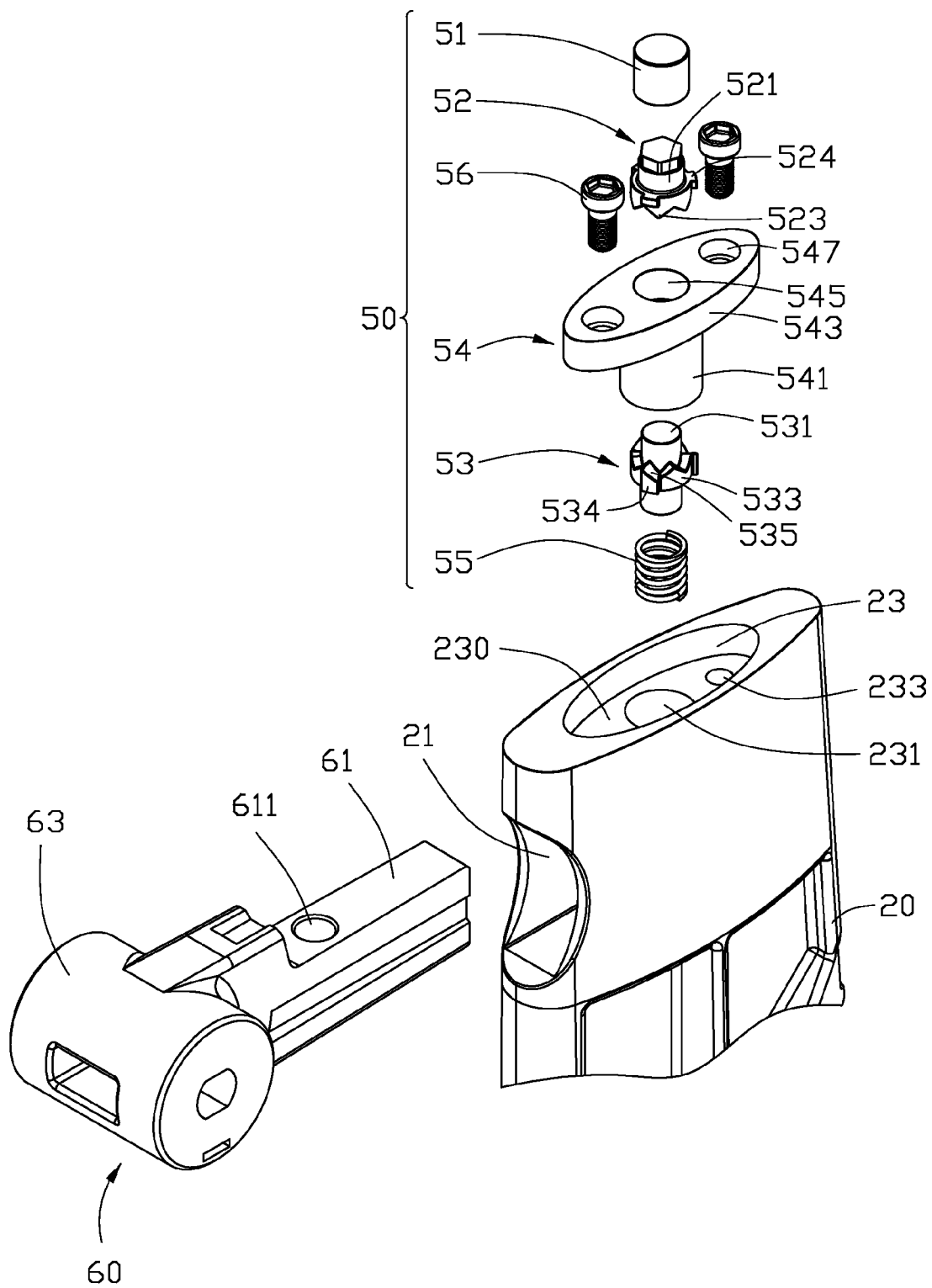
FIG. 3 is an exploded, isometric view of the support body, the connecting member and the fastening assembly of FIG. 2, the fastening assembly including a button, a driving member, a follower, a restricting member, and an resilient member.
Figure 11:
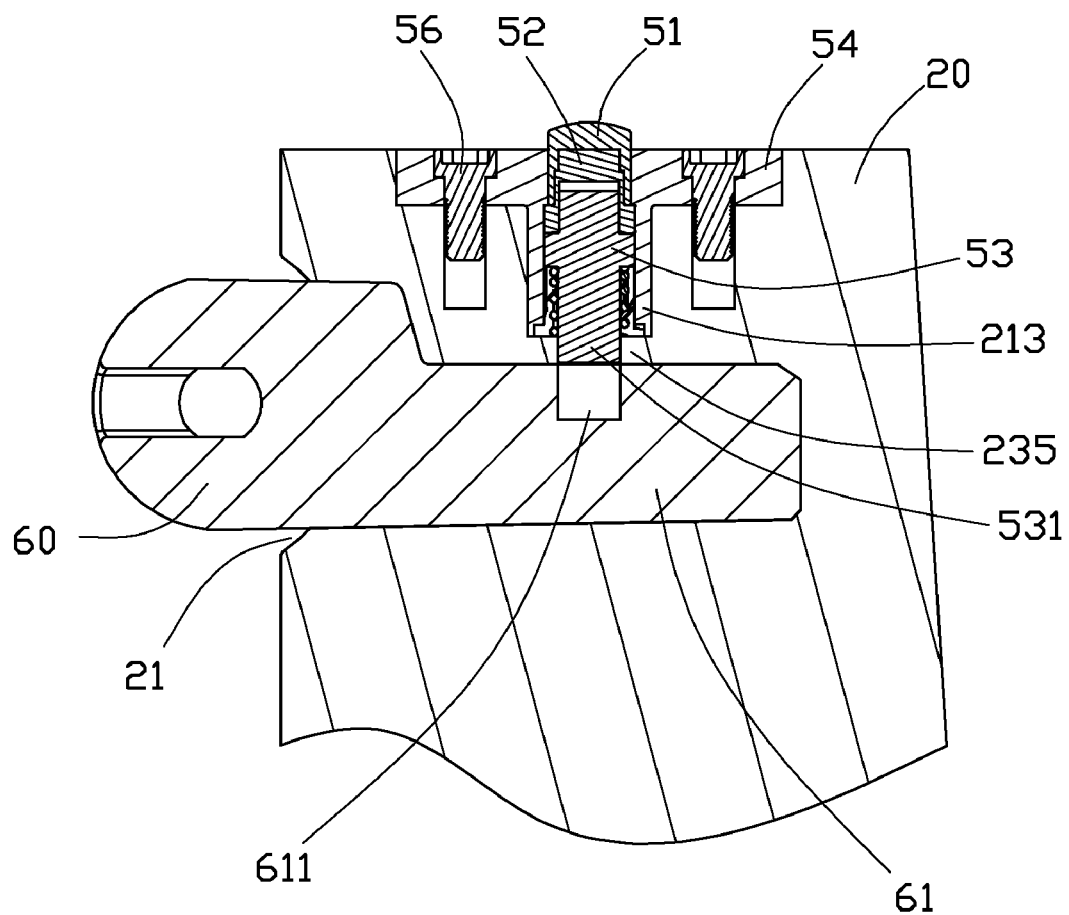
FIG. 11 is a partial cross-sectional view of the support stand of FIG. 1 taken along the A-A line, with the fastening assembly in an unlocked state.

Referring to FIG. 3, the support body 20 defines an assembling hole 21 in a side surface and a receiving groove 23 in a top surface. A bottom surface 230 of the receiving groove 23 defines two threaded holes 233 and a connecting hole 231 between the threaded holes 233. The connecting hole 231 communicates with the receiving groove 23 and the assembling hole 21. A resisting portion 235 (as shown in FIG. 11) is formed adjacent a bottom end of the connecting hole 231.

In the illustrated embodiment, the base 40 is circular. A positioning portion 41 is formed on the base 40.

The fastening assembly 50 includes a button 51, a driving member 52, a follower 53, a restricting member 54, a resilient member 55, and two fasteners 56.

The button 51 is a hollow cylinder. The driving member 52 includes a main body 521 and a first ratchet gear 523 extending from the main body 521. The main body 521 is substantially cylindrical. Three first guiding poles 524 are formed on a side surface of the first ratchet gear 523.

The follower 53 includes a positioning pole 531 and a second ratchet gear 533 formed on a middle portion of the positioning pole 531. Three second guiding poles 534 are uniformly formed on a side surface of the second ratchet gear 533. A top end of each second guiding pole 534 defines a first sloping surface 535.

Figure 4:
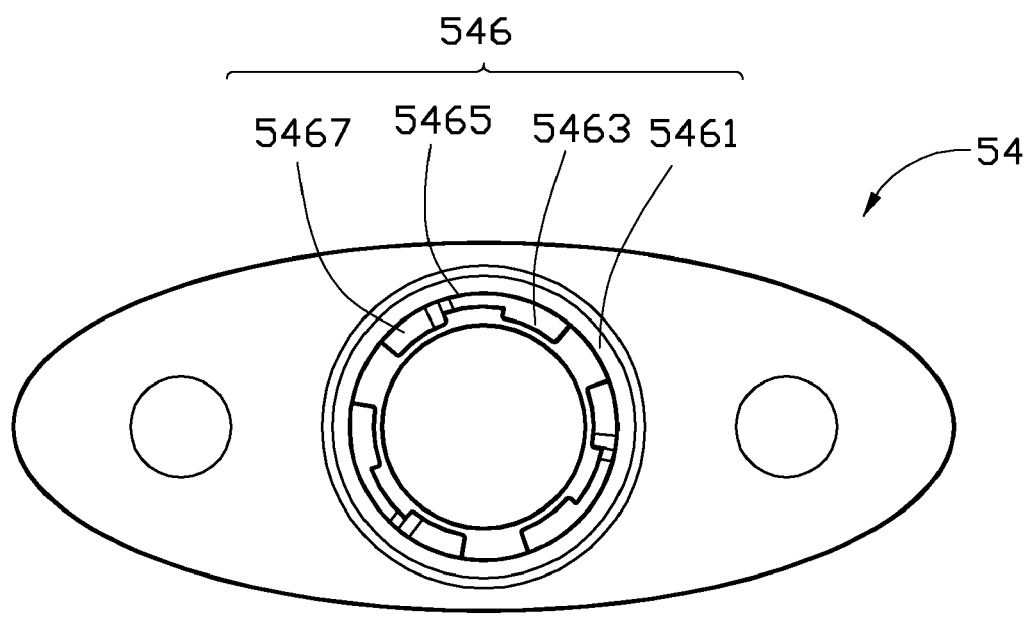
FIG. 4 is a bottom view of the restricting member of FIG. 3.
Figure 5:
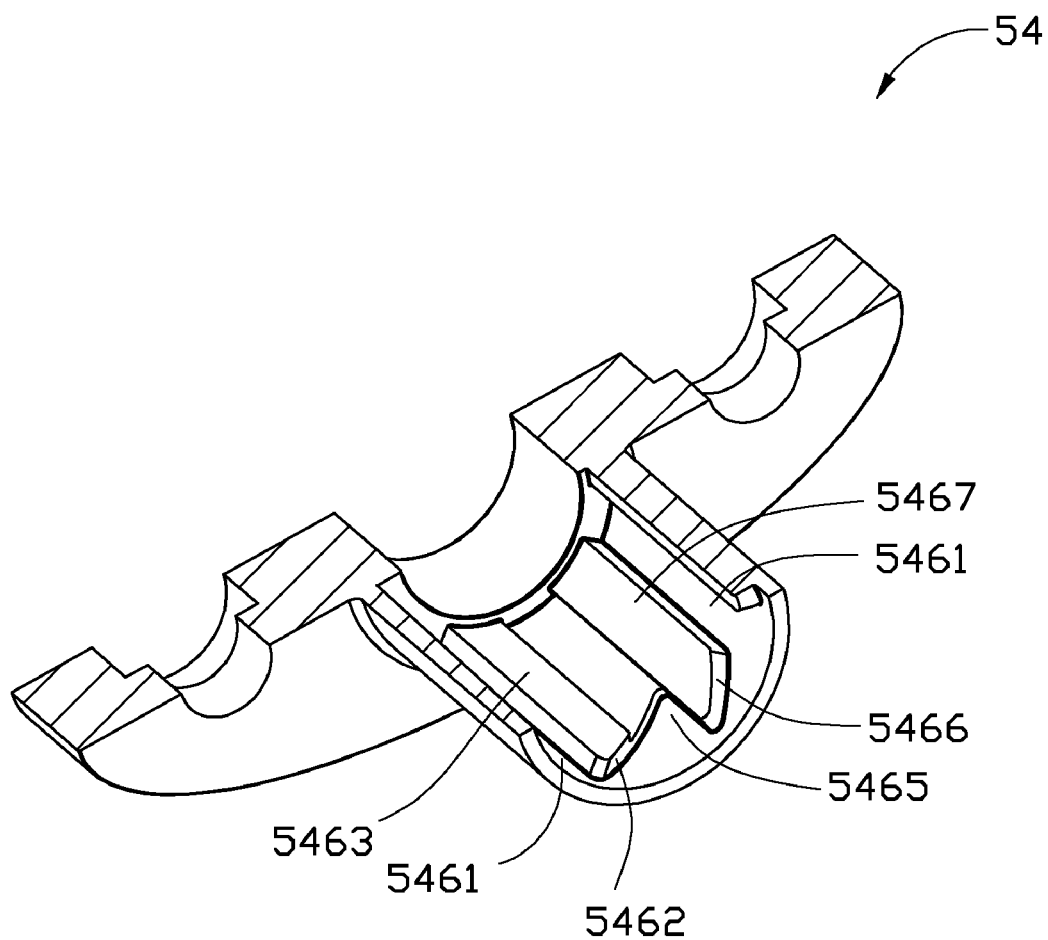
FIG. 5 is a semi-cutaway view of the restricting member of FIG. 3.

Referring to FIGS. 3 through 5, the restricting member 54 includes a cylindrical main body 541 and a connecting portion 543 formed on an end of the main body 541. The restricting member 54 defines a guiding hole 545 in a center portion, and two stepped holes 547 in opposite ends of the connecting portion 543. Three guiding portions 546 are formed on the inner surface of the guiding hole 545. Each guiding portion 546 includes a first guiding groove 5461, a second guiding groove 5465, a first guiding protrusion 5463, and a second guiding protrusion 5467. As shown in FIG. 5, a length of the first guiding protrusion 5463 is smaller than that of the second guiding protrusion 5467. A second sloping surface 5462 is formed on an end of the first guiding protrusion 5463. A third sloping surface 5466 is formed on an end of the second guiding protrusion 5467.

In the illustrated embodiment, the resilient member 55 is a compression spring. The fasteners 56 are screws.

The connecting member 60 includes an inserting portion 61, a connecting portion 63, and a hinge 67. The connecting portion 63 is formed at an end of the inserting portion 61. The inserting portion 61 defines an engaging hole 611 in a middle portion. The hinge 67 extends through the connecting portion 63, and is connected to an LCD panel (not shown).

In assembling the support stand 100, the resilient member 55 is positioned in the connecting hole 231 of the support body 20, and resists the resisting portion 235. The positioning pole 531 of the follower 53 is inserted into the resilient member 55. The driving member 52 is positioned on the follower 53, and the first ratchet gear 523 contacts with the second ratchet gear 533. The restricting member 54 is sleeved on the driving member 52 and the follower 53, and fixed in the receiving groove 23 via fasteners 56. The button 51 is positioned in the guiding hole 545 of the restricting member 54, and sleeved on the main body 521 of the driving member 52. The support body 20 is fixed on the base 40. The first housing 81 and the second housing 82 are engaged with the support body 20. The connecting member 60 is inserted into the assembling hole 21 of the support body 20.

In order to describe a cooperative movement of the driving member 52, the follower 53 and the restricting member 54, FIGS. 6 through 10 are shown. FIGS. 6 through 10 only show one first guiding pole 524 and one second guiding pole 534 moving relative to one corresponding guiding portion 546. The other two first guiding poles 524 and the other two second guiding poles 534 have a same movement relative to the other two guiding portions 546.

Figure 6:
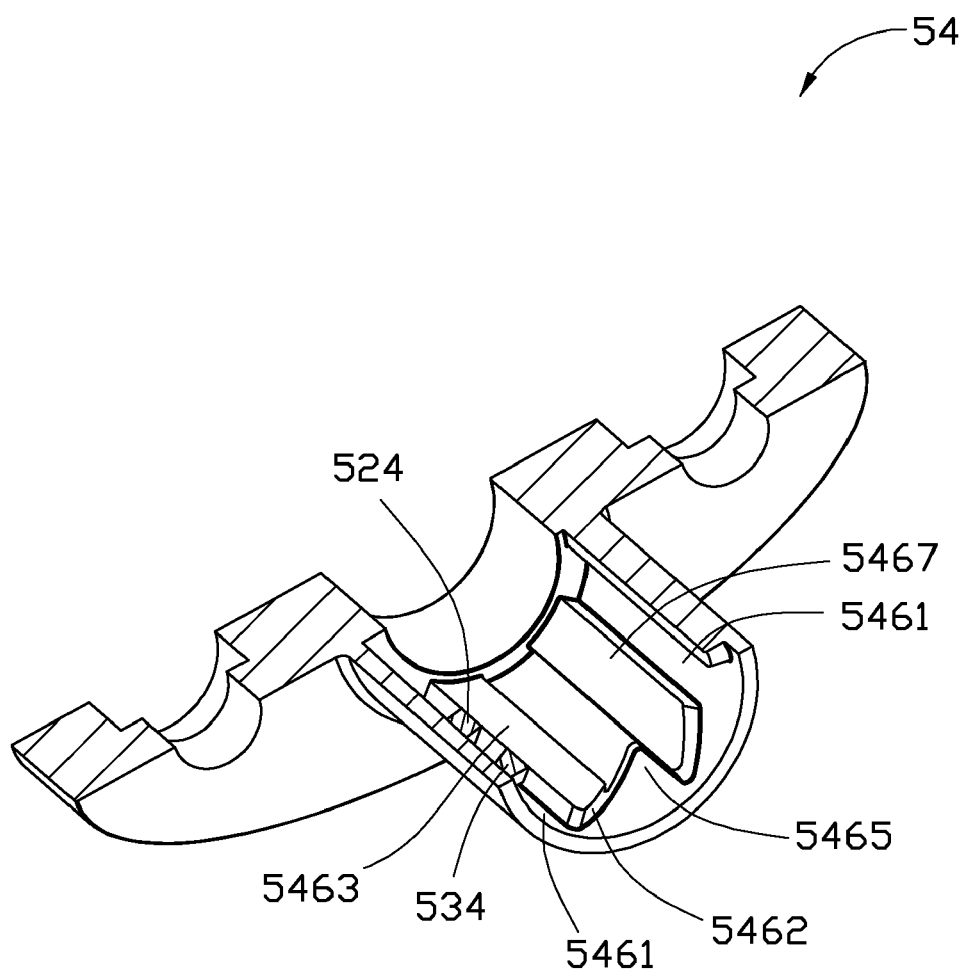
FIGS. 6 through 10 are semi-cutaway views representing a movement of a first guiding pole of the driving member and a second guiding pole of the follower in the restricting member.

The fastening assembly 50 is in an unlocked state in FIG. 6. As shown in FIGS. 3 and 11, in the unlocked state, the driving member 52 and the follower 53 are entirely received in the guiding hole 545 of the restricting member 54. The resilient member 55 is partially compressed. The first ratchet gear 523 is partially meshed with the second ratchet gear 533. The positioning pole 531 of the follower 53 is not engaged in the engaging hole 611 of the connecting member 60, and therefore the connecting member 60 is capable of disengaging from the support body 20. As shown in FIG. 6, both the first guiding poles 524 of the driving member 52 and the second guiding poles 534 of the follower 53 are engaged in the first guiding groove 5461 of the restricting member 54. The follower 53 cannot rotate relative to the driving member 52 because the first guiding poles 524 and the second guiding poles 534 are engaged in the first guiding groove 5461.

The button 51 is pressed downwards by an external force. The driving member 52 together with the follower 53 move downwards and the resilient member 55 is further compressed. The first guiding poles 524 slide in the first guiding grooves 5461. The second guiding poles 534 remain engaged in the first guiding grooves 5461 of the restricting member 54 until the second guiding poles 534 reach a bottom end of the first guiding protrusions 5463. When the button 51 is pressed further downwards, the second guiding poles 534 disengage from the first guiding grooves 5461, and then the follower 53 rotates for a predetermined angle relative to the driving member 52 due to an engaging force of the first ratchet gear 523 and the second ratchet gear 533, until the first ratchet gear 523 is entirely meshed with the second ratchet gear 533. Therefore, the first sloping surfaces 535 of the second guiding poles 534 become opposite to an end of the second sloping surfaces 5462 of the first guiding protrusions 5463. After that, the driving member 52 together with the follower 53 move downwards until the positioning pole 531 of the follower 53 is entirely engaged in the engaging hole 611 of the connecting member 60.

Figure 7:
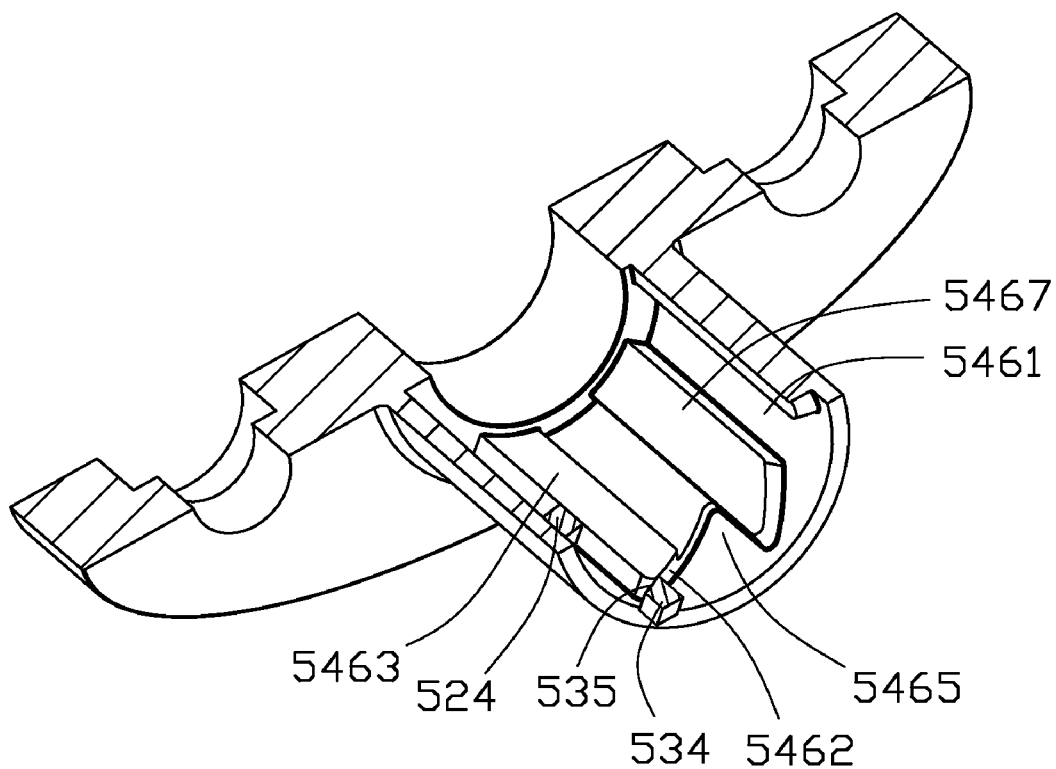
Figure 8:
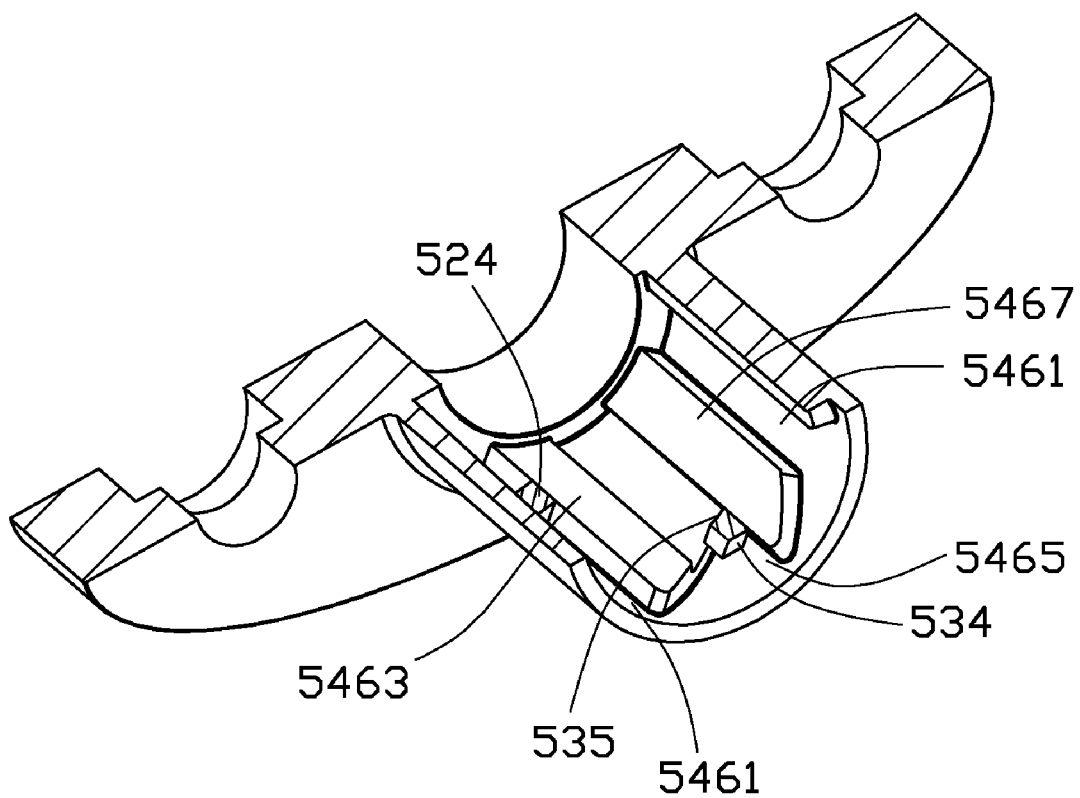
Figure 12:
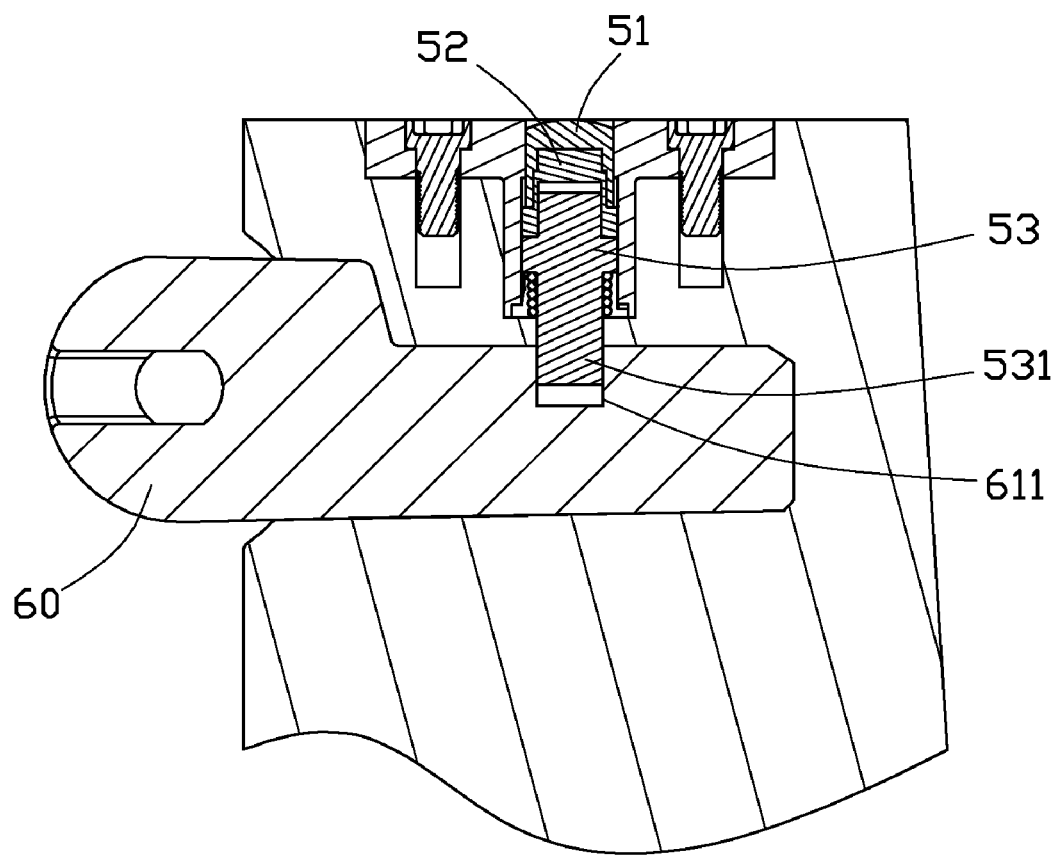
FIG. 12 is similar to the FIG. 13, but the fastening assembly is in a locked state.
Figure 13:
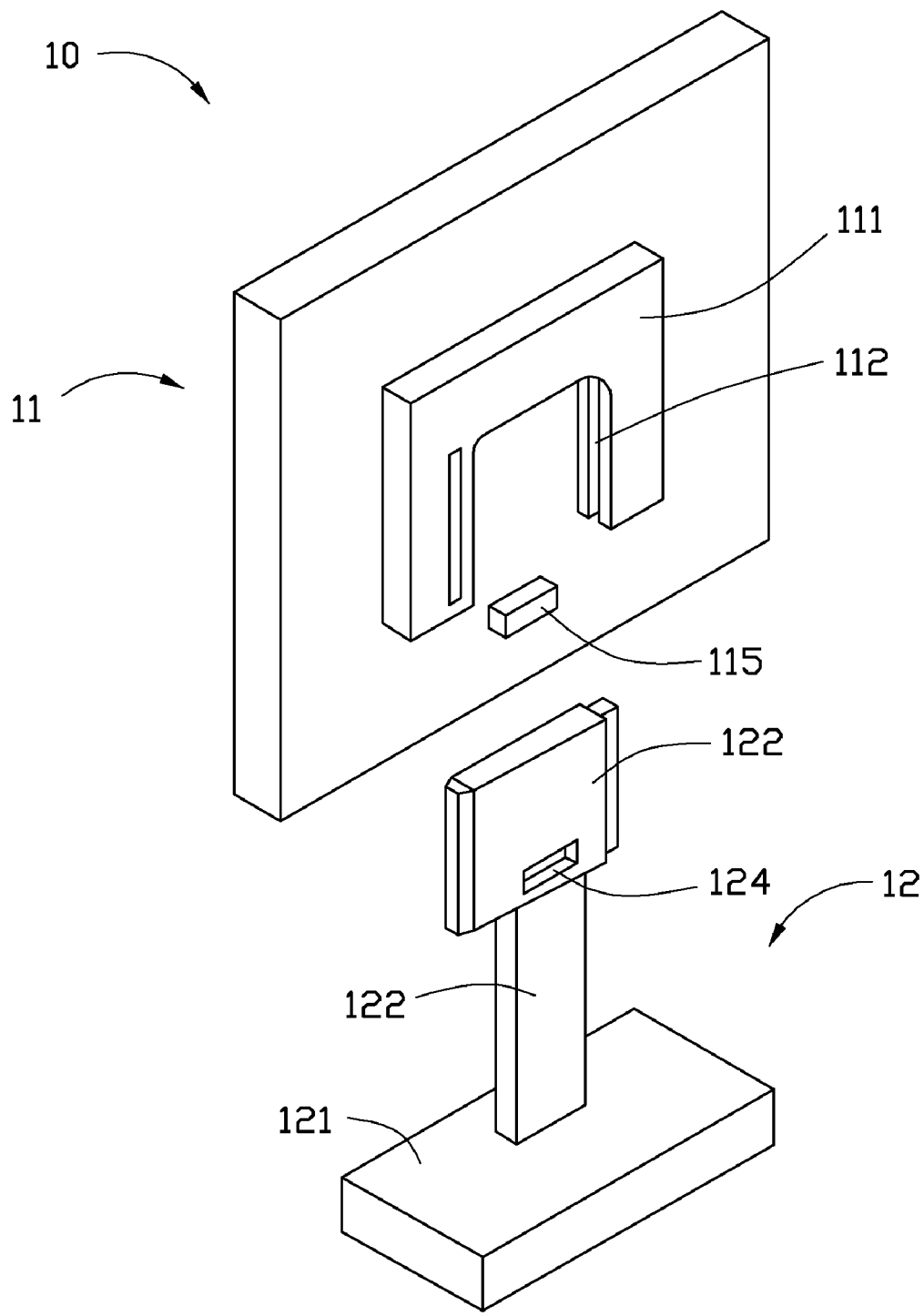
FIG. 13 is an exploded, isometric view of an LCD device applying a typical support stand.

Referring to FIGS. 3, 7 and 8, when the external force on the button 51 is removed, the follower 53 and the driving member 52 move upwards due to the elastic force of the resilient member 55, until the first sloping surfaces 535 of the second guiding poles 534 resist the second sloping surfaces 5462 (as shown in FIG. 7). Then, the follower 53 rotates through a predetermined angle because the second guiding poles 534 slide along the second sloping surfaces 5462 to engage in the second guiding grooves 5465. The driving member 52 still cannot rotate because the first guiding poles 524 are engaged in the first guiding grooves 5461 of the restricting member 54. Therefore, the first ratchet gear 523 is partially meshed with the second ratchet gear 533 again. The fastening assembly 50 is then in a locked state as shown in FIG. 8. As shown in FIGS. 3 and 12, in the locked state, the positioning pole 531 of the follower 53 is partially engaged in the engaging hole 611 of the connecting member 60, thus fastening the connecting member 60 to the support body 20 (as shown in FIG. 12).

Figure 9:
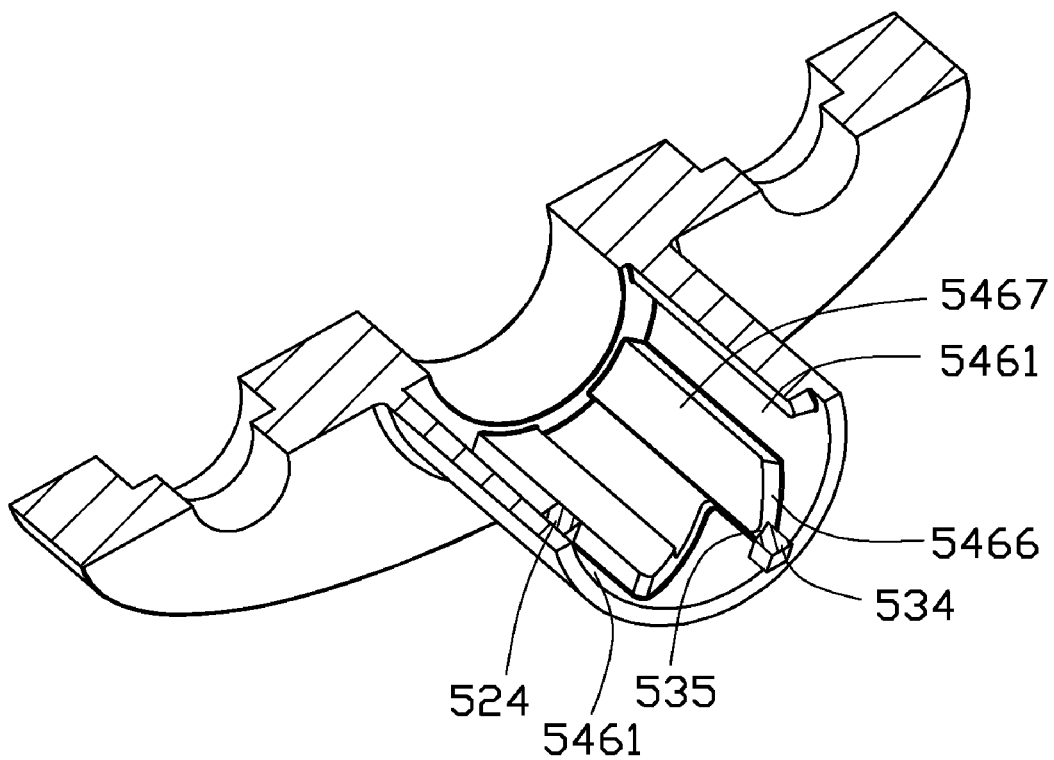

Referring to FIGS. 3, 8 and 9, when the external force is applied on the button 51 again, the driving member 52 and the follower 53 move downwards. The first guiding poles 524 slide in the first guiding groove 5461. The second guiding poles 534 are engaged in the second guiding grooves 5465 of the restricting member 54 until the second guiding poles 534 reach a bottom end of the second guiding protrusions 5467. When the button 51 is pressed further downwards, the second guiding poles 534 disengage from the second guiding grooves 5465, and then the follower 53 rotates for a predetermined angle relative to the driving member 52 due to an engaging force of the first ratchet gear 523 and the second ratchet gear 533, until the first ratchet gear 523 is entirely meshed with the second ratchet gear 533 again. Therefore, the first sloping surfaces 535 of the second guiding poles 534 become opposite to an end of the third sloping surfaces 5466 of the second guiding protrusions 5467. The external force on the button 51 is released, the follower 53 and the driving member 52 move upwards driven by the elastic force of the resilient member 55, finally the first sloping surfaces 535 of the second guiding poles 534 resist the end of the third sloping surfaces 5466 of the second guiding protrusions 5467 (as shown in FIG. 9).

Figure 10:
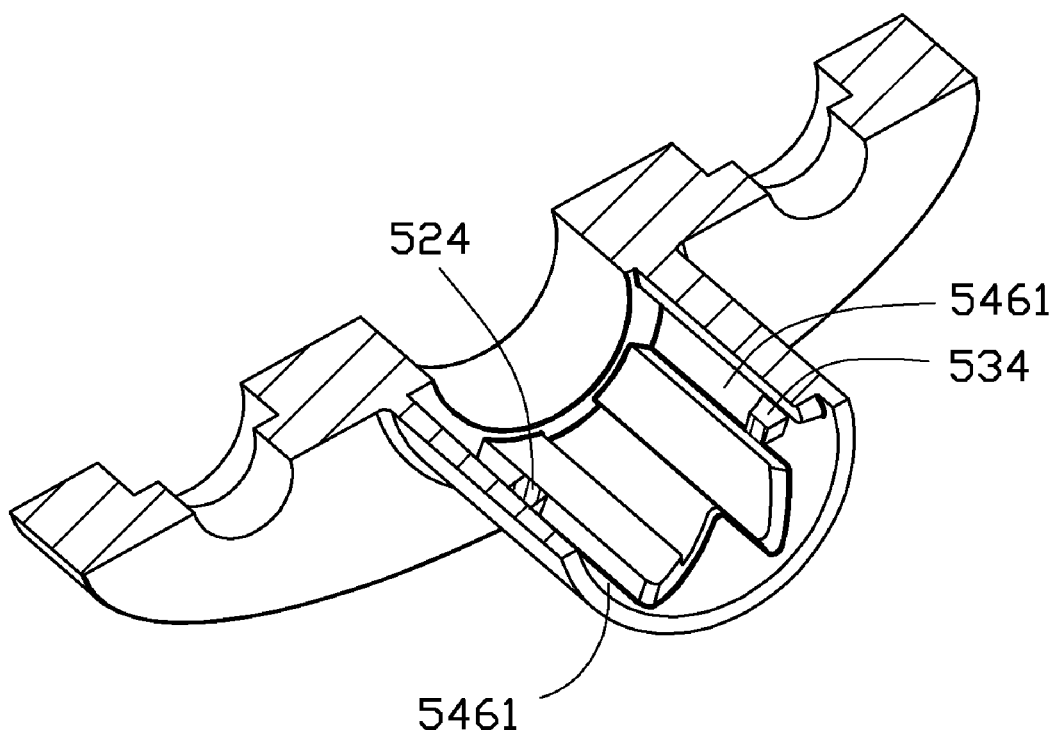

Referring to FIGS. 3, 9 and 10, after the first sloping surfaces 535 of the second guiding poles 534 resist the third sloping surfaces 5466, the follower 53 rotates through a predetermined angle to engages in another first guiding grooves 5461, because the second guiding poles 534 slide along the third sloping surfaces 5466. The follower 53 and the driving member 52 move further upwards until the positioning pole 531 of the follower 53 is entirely received in the guiding hole 545 of the restricting member 54. The fastening assembly 50 is in the unlocked state again as shown in FIG. 12.

Referring to FIGS. 11 and 12, when the fastening assembly 50 is in the unlocked state as shown in FIG. 6, the inserting portion 61 of the connecting member 60 is inserted into the assembling hole 21 of the support body 20, and the connecting hole 231 of the support body 20 communicates with the engaging hole 611 of the connecting member 60. The button 51 is pressed once by the external force, and fastening assembly 50 is in the locked state as shown in FIG. 8. The positioning pole 531 of the follower 53 extends through connecting hole 231, and engages into the engaging hole 611 of the connecting member 60. Therefore, the connecting member 60 is fixed to the support body 20.

In disassembling the connecting member 60 from the support body 20, the button 51 is further pressed by the external force, and the fastening assembly 50 is changed into the unlocked state again as shown in FIG. 10. Then, the positioning pole 531 moves upwards, and disengages from the engaging hole 611. Therefore, the connecting member 60 can be taken out of the support body 20.

When the LCD panel is fixed to the connecting member 60, the button 51 only needs to be pressed to assemble/disassemble the LCD panel to the support body 20. The weight of the LCD panel mainly acts on the connecting member 60 and the support body 20. Therefore the positioning pole 531 does not wear and tear easily, so that the support stand 100 has a long service life.

It may be appreciated that the fastening assembly 50 may be positioned on a side surface of the support body 20, and the positioning pole 531 is capable of engaging in the engaging hole 611 of the connecting member 60. The fastening assembly 50 may be composed of a driving device and a follower 53. The driving device, such as a drive cylinder, can drive the positioning pole 531 of the follower 53 engaging/disengaging with the connecting member 60. In addition, the driving member 52 may include one or more first guiding pole 524, and the follower may include one or more second guiding pole 534. One ore more guiding portion 546 is formed on the inner surface of the restricting member 54 corresponding to the first guiding pole 524 and the second guiding pole 534.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A support stand, comprising:
   a support body defining an assembling hole;
   a connecting member received in the assembling hole of the support body, and the connecting member defining an engaging hole; and
   a fastening assembly positioned on the support body, comprising:
      a follower;
      a restricting member positioned on the support body, and comprising a main body and a connecting portion formed on an end of the main body, wherein the restricting member defines a guiding hole in a center portion of the main body, and a guiding portion is directly formed on an inner surface of the guiding hole;
      a resilient member positioned in the restricting member and biased between the follower and the support body;
   wherein the follower has a positioning pole, the follower is movably connected to the restricting member, so that the positioning pole is capable of engaging/disengaging in the engaging hole of the connecting member; wherein the support body further defines a connecting hole intersecting with the assembling hole; and the follower is movably received in the connecting hole of the support body.

2. The support stand of claim 1, wherein the fastening assembly further comprises a driving member; wherein the follower and the driving member are received in the guiding hole of the restricting member, the follower is movable and rotatable relative to the driving member.

3. The support stand of claim 2, wherein the fastening assembly further comprises a button sleeved on the driving member.

4. The support stand of claim 2, wherein the resilient member is sleeved on the positioning pole, and produces an elastic force for driving the follower to engage with the driving member.

5. The support stand of claim 4, wherein a first ratchet gear is formed on the driving member; a second ratchet gear is formed on the follower; the first ratchet gear engages with the second ratchet gear.

6. The support stand of claim 5, wherein the guiding portion comprises a first guiding groove, a first guiding protrusion, a second guiding groove, and a second guiding protrusion in turn; a first guiding pole is formed on the driving member corresponding to the guiding portion, and a second guiding pole is formed on the follower corresponding to the guiding portion.

7. The support stand of claim 6, wherein a first sloping surface is formed on an end of the second guiding pole.

8. The support stand of claim 7, wherein a second sloping surface corresponding to the first sloping surface is formed at an end of the first guiding protrusion.

9. The support stand of claim 8, wherein a third sloping surface corresponding to the first sloping surface is formed at an end of the second guiding protrusion.

10. The support stand of claim 1, further comprising a base, the support body fixed on the base.

11. The support stand of claim 10, further comprising a first housing and a second housing, the first housing and the second housing are engaged with the support body.

12. A support stand, comprising:
    a support body defining an assembling hole in a side surface and a connecting hole on a top surface, wherein the connecting hole intersects with the assembling hole;
    a connecting member received in the assembling hole of the support body; and
    a fastening assembly positioned on the support body, comprising:
       a restricting member positioned on the support body, and comprising a main body and a connecting portion formed on an end of the main body, wherein the restricting member defines a guiding hole in a center portion of the main body, and a guiding portion is directly formed on an inner surface of the guiding hole;
       a follower and an resilient member positioned in the restricting member;
    wherein the follower has a positioning pole, the follower is movably connected to the restricting member, and the resilient member is positioned between the follower and the restricting member, wherein the positioning pole is capable of engaging with the connecting member through the connecting hole by an external pushing force to lock the positioning pole in the restricting member, and disengaging with the connecting member by an elastic force of the resilient member to release the positioning pole from the restricting member.

13. The support stand of claim 12, wherein the fastening assembly further comprises a driving member for driving the follower to move.

14. The support stand of claim 13, wherein a first ratchet gear is formed on the driving member; a second ratchet gear is formed on the follower; the first ratchet gear engages with the second ratchet gear.

15. The support stand of claim 12, further comprising a base, the support body fixed on the base.

16. The support stand of claim 15, further comprising a first housing and a second housing, the first housing and the second housing are engaged with the support body.

* * * * *